Jan. 20, 1942.    M. S. GRUNDER    2,270,293
ELECTRIC COOKING PLATE
Filed Sept. 7, 1938

INVENTOR.
Maynard S. Grunder
BY Fred G. Matheny
ATTORNEY.

Patented Jan. 20, 1942

2,270,293

UNITED STATES PATENT OFFICE 2,270,293

ELECTRIC COOKING PLATE

Maynard S. Grunder, Puyallup, Wash.

Application September 7, 1938, Serial No. 228,781

3 Claims. (Cl. 219—37)

This invention relates to electric cooking plates and the object of this invention is to provide an electric cooking plate having a depressible central portion whereby a cooking utensil with either a flat or bulging bottom will rest firmly and securely on said electric cooking plate without tipping or tilting and whereby an efficient heat transmitting relation will always be maintained between the bottom of the cooking utensil and the electric cooking plate irrespective of whether the bottom of the cooking utensil is flat or bulged.

Another object of the invention is to provide an electric cooking plate of this nature which is equally well adapted for the reception of large or small cooking utensils.

Another object of the invention is to provide an electric cooking plate having a heating element which is yieldable so that it will conform to the shape of the bottoms of cooking utensils irrespective of whether said bottoms are flat or bulged.

Cooking utensils, after they have been used even for a short period of time, are liable to have bulging or outwardly convex bottoms. When placed on flat plane cooking plates these utensils with bulging bottoms are unstable and will rock and tilt. Also a small area of the central portion of the bulging bottom of the utensil will rest directly on the cooking plate and the major portion of the utensil bottom outwardly from the center will be clear of the plate. This brings about an uneven distribution of heat over the bottom of the utensil with the result that much heat is lost by passing outwardly between the cooking plate and the utensil bottom and the food in contact with the central portion of the utensil bottom is liable to be scorched while the food near the periphery of the utensil may not receive enough heat to efficiently cook it.

Other and more specific objects of the invention will be apparent from the following description taken in connection with the accompanying drawing.

Like reference numerals designate like parts throughout the several views.

Figures 1, 2:
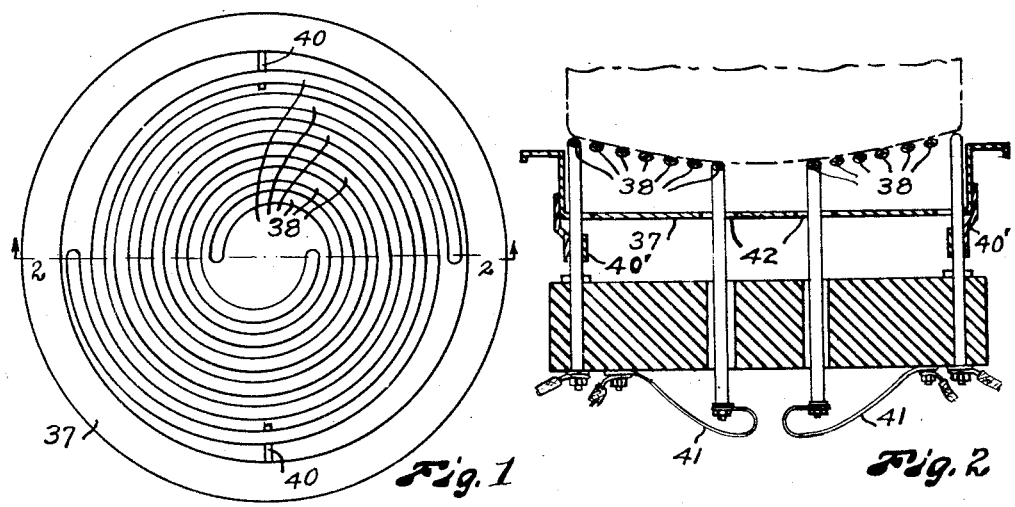
Fig. 1 is a plan view of an electric cooking plate constructed in accordance with this invention.
Fig. 2 is a sectional view of the same substantially on broken line 2—2 of Fig. 1.

In Figs. 1 and 2, I have disclosed an electric cooking plate having heating element means which is resilient so that the weight thereon of a cooking utensil which has a bulging bottom portion will depress the central portion of the heating element means. This provides a construction in which the heating element means conforms to the shape of the bottom of the utensil and always maintains efficient contact therewith. Said Figs. 1 and 2 disclose a pan shaped plate 37 preferably of metal. Two spiral shaped heating elements 38 of well known form in which the resistance wires are disposed within metal tubes, constitute the portion of the plate on which the cooking utensils rest. The peripheral portions of these heating coils are fixedly supported by bracket means 40 and by clamp means 40' connected with the downwardly extending terminal end portions of said coils, so that they are not depressible. The terminal end portions at the inner ends of these coils are positioned near the center of the plate and extend downwardly through holes 42 in the bottom portion of the plate and are electrically connected with resilient conductors 41 whereby they are free to move up and down. The heating elements are thus left free to move downwardly at the center and said elements possess sufficient resiliency so that their central portions will be depressed by the weight of the ordinary cooking utensil and contents thereof. This provides heating element means which conforms to the shape of a cooking utensil with a bulging bottom. When the central portions of these elements are not depressed by pressure they will preferably occupy a position in a plane common to the marginal portions of the heating element means or may even protrude above this plane so that they will contact the surface of a cooking utensil with a flat bottom or an upwardly concave bottom.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In an electric cooking unit for use with cooking utensils having bulging bottoms, an electric heating element shielded within a yieldingly self supporting resilient tube that is coiled in a substantially flat helix; and means rigidly supporting the peripheral portion of said helical tube leaving the central portion thereof self supported through its connection with the peripheral supporting means and free to yield to pressure, the resiliency of said helical tube rendering the central portions thereof depressible by a cooking utensil with a bulging bottom, whereby said helical tube will maintain contact with the bulging bottom of the utensil substantially from the center to the periphery thereof.

2. An electric cooking unit for use with cooking utensils having bulging bottoms comprising two yieldingly self supporting resilient tubes each coiled in a substantially flat open-coil helix, said two helical tubes being positioned so that they interfit and have a substantially common center, each helical tube having one end thereof positioned near the periphery of the cooking unit and the other end thereof positioned near the center; electric heating elements in said helical tubes; conductor means connected with said electric heating elements at each end portion of each helical tube; and means rigidly supporting the peripheral portion of each helical tube, the central portion of each helical tube being yieldingly self supporting through its connection with the rigidly supported peripheral portion thereof and being yieldable to pressure and having a resiliency which renders it depressible by a cooking utensil with a bulging bottom and conformable to the shape of the bottom of the utensil.

3. An electric cooking unit for use with cooking utensils having bulging bottoms comprising a dish shaped member having a depressed central portion and upwardly extending marginal portions; two yieldingly self supporting tubes each coiled in a substantially flat open-coil helix, said two helical tubes being positioned so that they interfit and have a substantially common center and so that they extend across the upper portion of said dish shaped member, each helical tube having one downwardly extending end portion positioned near the center of said dish shaped member and another downwardly extending end portion positioned near the margin of said dish shaped member; electric heating elements in said helical tubes; conductor means connected with said electric heating elements at each downwardly extending end of each helical tube; and means rigidly supporting the peripheral portion of each helical tube adjacent the marginal portion of said dish shaped member, the central portion of each helical tube being self supported through its connection with the rigidly supported peripheral portion thereof and being free to yield to pressure and having a degree of resiliency which renders it depressible by and conformable to a bulging bottom of a cooking utensil positioned thereon.

MAYNARD S. GRUNDER.